United States Patent [19]

Murphy

[11] Patent Number: 4,899,963

[45] Date of Patent: Feb. 13, 1990

[54] SUPPORT SADDLE FOR ELONGATE ARTICLES AND INTERPOSITIONING DEVICE FOR DISSIMILAR SURFACES

[76] Inventor: Patrick J. Murphy, 9011 Lloyd La., Stockton, Calif. 95212

[21] Appl. No.: 305,552

[22] Filed: Feb. 6, 1989

[51] Int. Cl.$^4$ .............................................. F16L 3/08
[52] U.S. Cl. ..................................... 248/65; 24/16 R; 248/74.3; 403/400
[58] Field of Search ............... 248/65, 49, 68.1, 74.3, 248/219.4, 73, 74.1, 218.4; 24/16 R, 168 B, 17 A, 17 B, 17 AP, 458, 483; 403/385, 389, 390, 400

[56] References Cited

U.S. PATENT DOCUMENTS

| | | | |
|---|---|---|---|
| 1,646,423 | 10/1927 | Schaub | 248/49 |
| 2,632,217 | 3/1953 | Flora | 248/49 X |
| 3,026,076 | 3/1962 | Bender | 248/49 |
| 3,233,383 | 2/1966 | Salm | 248/49 X |
| 3,771,751 | 11/1973 | Derivaz | 358/49 X |
| 4,017,046 | 4/1977 | Hicks | 248/49 X |
| 4,445,656 | 5/1984 | Leitch et al. | 248/49 |
| 4,513,934 | 4/1985 | Pruyne | 248/49 |
| 4,687,185 | 8/1987 | Urand et al. | 248/49 X |
| 4,744,535 | 5/1988 | Patenaude | 248/74.1 |
| 4,766,651 | 8/1988 | Kobasyashi et al. | 214/16 PB |

Primary Examiner—Ramon O. Ramirez
Attorney, Agent, or Firm—Wallace F. Neyerlin

[57] ABSTRACT

A support saddle which tethers a pipe, cable, wire, conduit or other elongate article to the support saddle, which, in turn, is fastened to a support surface, said support saddle also having a design such that it is easily and readily employable as an intermediate connecting device used to aid in the bonding of a flat surface to a round surface, or vice-versa. The support saddle can also be used with a complementing removable base so as to controllably alter the distance of the elongate article supported in the saddle from the support surface.

43 Claims, 4 Drawing Sheets

SUPPORT SADDLE FOR ELONGATE ARTICLES AND INTERPOSITIONING DEVICE FOR DISSIMILAR SURFACES

FIELD OF THE INVENTION

The following invention relates generally to a support device upon which one or more elongate articles such as tubing, conduit, wiring, plumbing lines or the like are constrained to remain fixed. More specifically, the elongate pipe, cable etc., is supported upon a saddle which has an inclined "V" shaped support surface. The saddle is fixed on a wall, floor, ceiling or the like. The saddle holds the pipes or cables in a fixed position by means of tape, clamps or other types of ties. When combined as described herein, two such saddles can be removably attached together so as to become an interposing member between separated elongate articles, thereby allowing the bonding together of said elongate articles. The support saddle can also be used with a complementing removable base so as to controllably alter the distance of the elongate article supported in the saddle from the support surface.

BACKGROUND OF THE INVENTION

Conduit, cable, wiring and pipelines, for example, are the "lifelines" which transmit fluid, power, electrical signals, etc., to virtually all machinery and other instrumentalities. Traditionally, in order to provide support for these lifelines, keep them in neat bundles, and offset the effects of vibration for example, various types of hardware have evolved which hold and fix these lifelines in position. Thus, a multiplicity of support brackets, clamps, ties and other constraints are used in an attempt to maintain order in what otherwise would be a tangled mass of wire, conduit, etc.

It should be pointed out that to date, no single instrumentality is known which can span the spectrum of diverse needs that exist for example in the plumbing, electrical and other fields. While one bundling system for a plurality of cables or romex may be suitable in telephone wiring, computer wiring, television or stereo wiring, etc., such a device may not have similar utility in the plumbing field or in areas where objects are to be fixed to existing support surfaces.

More specifically, some applications require electrical insulation, others require isolation from vibration and still others require thermal insulation. No known device presently exists which can span these diverse needs with a single, standardized support saddle which fixes the object to an existing support surface.

A search of the prior art carried out in the Patent Office confirms, it is believed, that before the present invention, no one previously had invented a device having the universality of application uses possessed by the support saddle of the present invention. The following patents were located:

| U.S. Pat. No. | Inventor | Issue Date | Title |
| --- | --- | --- | --- |
| 492,593 | Taylor | 2/28/1893 | Pipe Support |
| 1,646,423 | Schaub | 10/25/1927 | Cradle for Hydraulic Pipe Lines |
| 3,523,667 | Guerrero | 8/11/1970 | Conduit Spacer |
| 3,771,751 | Derivaz | 11/13/1973 | Pipe Clamp |
| 3,964,707 | Lewis | 6/22/1976 | Underground Conduit Holder |
| 4,513,934 | Pruyne | 4/30/1985 | Pipe-Supporting Device |

The Taylor patent shows a two part support unit that allows it to be attached by a screw to the base. The retaining unit is bolted to the base portion; FIG. 4 shows a bracket with no retainer unit.

The Schaub patent discloses the use of a flexible retaining strip to hold the pipe in its support.

The Guerrero and Lewis patents show the stacking of holders and the use of plastic units.

Derivaz shows the vee shape of unit to accomodate various sizes of pipes, and also shows the use of flexible bands.

The Pruyne patent discloses the use of pyramid shaped towers to form a vee shape to hold the pipe.

However, none of these patents either singly or in combination with any of the others teaches or suggests a support saddle device having all of the essential features of the saddle of the present invention.

SUMMARY OF THE INVENTION

The instant invention complements: the existing use of cable ties, stainless steel hose clamps, plumbers tape and other basic products that are presently employed by tradesmen in fixing their work to a support surface; and/or procedures as are taught by the prior art.

In its essence, the instant invention describes a support saddle which is interposed between a support surface and articles to be carried, such as wiring, cable or pipe and easily secures them to the support surface.

In order to span these diverse uses, the support saddle of the instant invention is formed from an inert material such as high density plastic, such as but not limited to polyethylene or polypropylene, which is impervious to thermal and electrical conductivity, galvanic attraction, vibration, etc. It is also weather resistant.

Besides being inert, the use of the support saddle of the instant invention is distinguished over known techniques fixing work to a support surface in that it is "self-centering" so that articles laid thereon and fixed thereto are naturally retained thereon along an axis of symmetry of the support saddle, and held away from the saddle mounting surface.

Further, in a preferred embodiment, the self-centering feature includes a surface contour which discourages articles supported thereon from vibrating away from the support. The support surfaces themselves have a plurality of teeth-like imbrications that have been integrally incorporated for a two fold reason: (A) that encourages the articles supported thereon to be maintained in place even in the presence of vibration, or forces imposed upon the articles supported as by tensioning or twisting the articles through circuitous paths: and (B) that provides minute surface contact between articles and the support surfaces so as to allow for controlled article migration via the tension applied to the tethering means so as to permit expansion and contraction (particularly in the longitudinal direction) of the article (such as solar piping) in conjunction with the mounting surface due to outside forces such as weather and or structural movement.

In its essence, the instant invention includes a "V" shaped support saddle having an inclined inner first and second surface terminating at the crotch area of the "V". Each inner surface is preferably provided with a plurality of steplike imbrications. A top most portion of each support surface defining the "V" includes openings through which a conventional tie wrap, hose clamp, tape or other affixing instrumentality can pass so that the article to be supported thereon is fixed thereto by the wrap, clamp or tape.

Ideally, the support saddle according to the present invention is formed as a single, molded shell of inert plastic material such as polyethylene or polypropylene which is configured in one or more embodiments to be fastened to almost any surface by use of nails, screws, adhesive or other known fasteners, and is contoured for light weight, easy positioning on the support surface to which it is to be affixed. The support saddle is also provided integrally with a chamber surrounding each fastener hole which acts as a reservoir for a sealing compound, and which upon installation of a fastener such as a screw, becomes pressurized so as to direct the sealing agent into and around the point of penetration of that fastening device thereby preventing migration of intruding environmental elements that are meant to be repelled by the mounting surface; as in the case of a rooftop installation, preventing rainwater leaks. The support saddle also has means for ready access to an interior portion thereof to assist in removing an existing tether such as a vinyl tie wrap, hose clamp, etc., to later re-attach with the same tether or to replace it with another if the need exists. This can readily be accomplished without detaching the support saddle from the support surface after it has been attached thereto.

The unique structure or configuration of the support saddle also enables its use for another unique function; it is integrally capable of becoming an interposing member involved in the attaching of flat articles such as signs, clipboards, etc., to round articles such as light poles, power and telephone poles etc., as will hereinafter be made clearer by reference to the appended drawings.

OBJECTS OF THE INVENTION

Accordingly, it is a primary object of the present invention to provide a novel and useful device for tethering articles to a support surface.

A further object of the present invention is to provide a device as characterized above which is extremely durable in construction, (including being weather resistant and of sufficient structural strength to be attached to a load bearing surface and to support a longitudinal conduit of variable diameter embraced by same) economical, safe to use and lends itself to the economies of scale associated with mass production techniques.

A further object of the present invention is to provide a device as characterized above which is easily attached to a support surface through known fastening techniques.

A further object of the present invention is to provide a device as characterized above which complements the use of known tethers.

A further object of the present invention is to provide a device as characterized above which securely fixes articles to be supported thereon in a reliable manner, and in an easy fashion.

A further object of the present invention is to provide a device so configured which allows a previously tethered supported article to be released and then reattached in an expeditious manner and to accomplish this without detaching the supoprt saddle from the support surface after it has been attached thereto.

Viewed from one vantage point, it is an object of the present invention to provide a support saddle which includes a first and second support wall inclined such that the walls define a substantially "V" shaped trough so that articles can be placed within said trough, means for attaching the support saddle to a support surface, and means for removeably attaching a tether around the trough and over the articles to constrain the articles thereto.

Viewed from a second vantage point, it is an object of the present invention to provide a device for supporting a plurality of elongate articles to an underlying surface which includes a trough upon which the articles are to be placed, a housing integrally formed with said trough including attachment means to locate the device on the surface, and access openings on the device to allow a tether to pass therethrough to constrict the article between a portion of the tether and the trough.

Viewed from a third vantage point, it is an object of the present invention to provide a saddle which is interposed beetween an article and a support surface which includes attachment means for connecting the saddle to the surface, a trough on a surface of the saddle for receiving the article, access ports on the saddle for receiving a tether which holds the article in the trough and teeth-like imbrication means on the trough supporting surface, which imbrications have been integrally incorporated in the trough of the saddle so that the article being supported can controllably be allowed to ride free with minimal contact with the support saddle; or, optionally winched down tightly into the imbrication teeth so as to restrict movement of any kind, including twisting.

These and other objects will be made clearer when considering the following detailed specification taken in conjunction with the appended drawing figures.

BRIEF DESCRIPTION OF THE DRAWING FIGURES

FIG. 11 is a perspective view showing how two support saddles as illustrated in FIG. 2 can be removably attached together so as to become the interposing member between separated elongate articles, wherein because of the flat mating surfaces of the support saddles they may be rotated in any direction, thereby allowing the bonding together of said elongate articles in any direction up to 360 degrees to one another. Two support saddles as illustrated in FIG. 1 can also be used together in this manner to accomplish the same purpose.

FIG. 12 is a schematic view showing how the support saddle of FIG. 7a may be utilized in conjunction with an ancillary member so as to attach it to a flat support surface, but spaced therefrom by a distance defined by the height of the ancillary member.

FIG. 13 is a schematic view showing how the support saddle may be utilized to connect a longitudinal load to a beam which is transverse to the load, via intermediate attachment to a beam clamp.

FIGS. 14 and 14a are schematic views of another diverse use for the support saddle wherein it is first cut in half as shown in FIG. 14 and a portion of each half is then slid behind a pipe and then each half of the saddle is strapped to the pipe in order to attach it to the mounting surface. This procedure may be resorted to regardless of the gap between the pipe and the mounting surface; and can also be resorted to eliminate or minimize the problem of making good and well aligned electrical connections such as in the case of where there are offset bends for electrical risers as shown in FIG. 14a.

BRIEF DESCRIPTION OF THE PREFERRED EMBODIMENTS

Referring to the drawings now, wherein like reference numerals refer to like parts throughout the various drawing figures, reference numeral 10 is directed to the support saddle according to the present invention. Reference numeral 10' is used to designate a modified version of the support saddle.

In its essence, the support saddle or 10' includes a pair of inclined walls 2, 4 which collectively form a trough upon which pipes, wires, conduits or other elongate articles are to be affixed, either singly or as a plurality. The saddle 10 is integrally formed as a housing which can be removeably attached to a support surface. Openings 8, 20 are provided to allow a clamp CL to be oriented such that the pipe P is constrained to reside within the trough by girding the pipe and the trough with the clamp CL in a manner to be defined. The clamp CL passes through openings 8 and underlies the trough, and overlies the pipe to fix the pipe thereto.

Figures 1, 2, 3, 4:
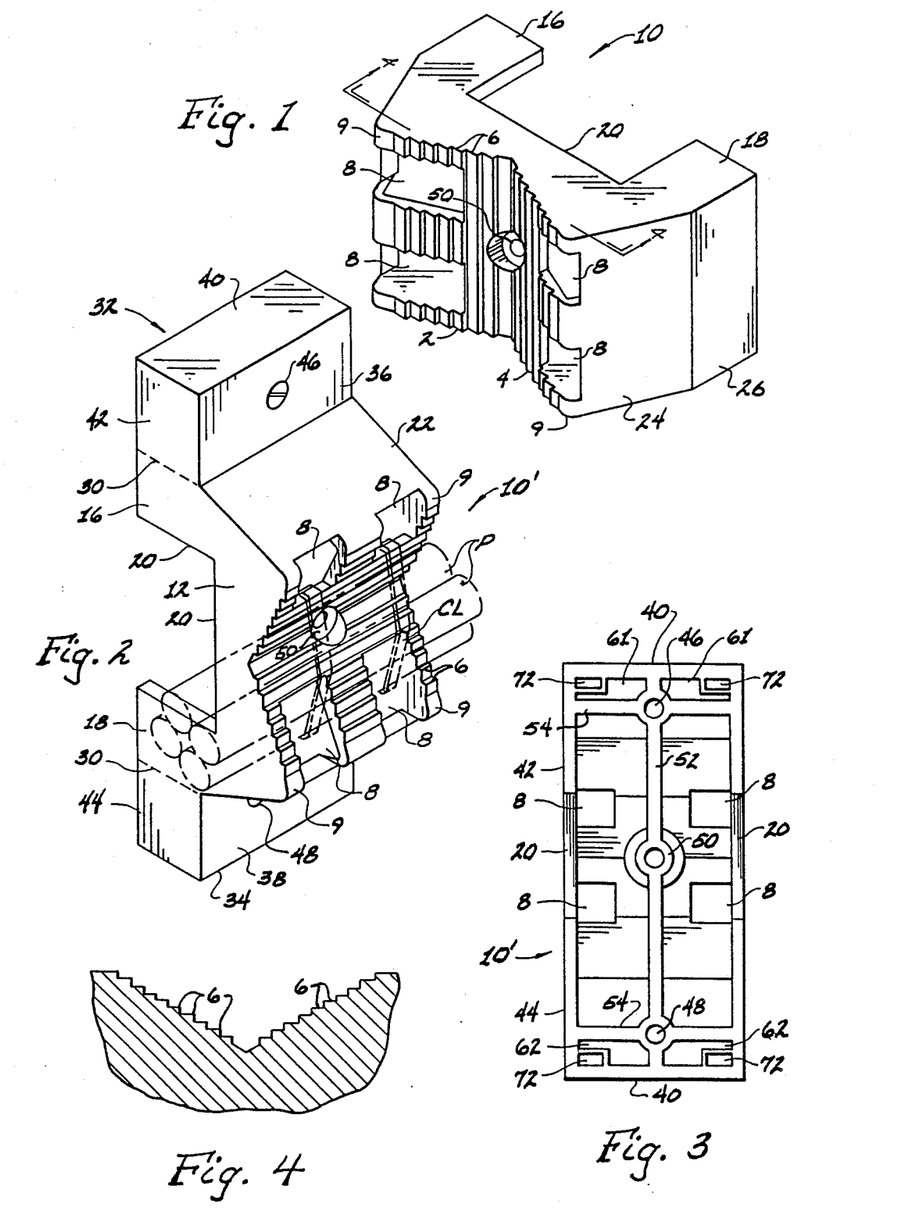
FIG. 1 is a perspective view of a device of the present invention according to one embodiment thereof.
FIG. 2 is a perspective view of a device of the present invention according to a second embodiment thereof and showing the utility thereof with respect to showing the tethering of a plurality of longitudinal articles.
FIG. 3 is a bottom view of that which is shown in FIG. 2.
FIG. 4 is a sectional view taken along lines 4—4 of FIG. 1 focusing on one feature of the instant invention.

More particularly, and with reference to FIG. 1, a first support saddle 10 according to the present invention is disclosed. The saddle 10 is formed as a shell of high density plastic, such as polyethylene or polypropylene configured to have a first surface 2, a second surface 4 inclined with respect to the first surface so as to define a substantially "V" shaped trough. Inner, facing surfaces of the "V" shaped trough are intended to support thereon a pipe or other type of conduit and fix the pipe P with respect to a support surface (not shown). Thus, an area of intersection between the first and second surfaces 2, 4 includes a bore 50 which allows a screw or nail for example to pass therethrough and connect the saddle 10 to the support surface. Note that the bore 50 is countersunk to allow a fastener to nest therein and not interfere with the placement of the pipe P within the trough.

As shown most clearly in FIG. 4, the contacting surfaces of the trough are provided with a plurality of imbrications 6 which improve the ability of the pipe P to remain secured in the trough. The imbrications act like teeth which resist the tendency of the pipe to ride up on either of the inclined surfaces and thus cause the pipe P to remain centered. The terracing effect afforded by the imbrications is best realized when the teeth descend stair-like towards the lower most portion of the trough defined by the intersection of the inclined surfaces.

As shown from looking at the perspective views of both FIGS. 1 and 2, the support saddle 10 includes rear walls 22, 24 respectively extending from the inclined surfaces 2, 4 at edges remote from the intersection of the first and second surfaces. These rear walls 22, 24 when considered with the inclined first and second surfaces 2, 4 collectively form a substantially "W" shaped structure. Peaks 9 define the area of transition between each inclined surface and its respective canted rear wall. Note the presence of openings 8 which pass through major portions of the first and second surfaces 2, 4 and minor portions of the canted rear walls 22, 24. The significance of these openings 8 will be detailed infra.

The support saddle 10 includes first and second peaked sidewalls 12, 14 which follow the contour of the inclined first and second surfaces 2, 4 and the canted rear walls 22, 24. The sidewalls 12, 14 communicate with sidewall legs 16, 18 remote from the peaks 9. As shown in FIG. 1, the remainder of the housing is formed by rear legs 26, 28 extending between lower most edges of the canted rear walls 22, 24 and outboard edges of the sidewall legs 16, 18. Note also that a rectangular cutout 20 is provided on the sidewalls, between the sidewall legs 16, 18 and below the peaked sidewalls 12, 14. The significance of the rectangular cutout 20 in conjunction with openings 8 can now be explained.

As shown in FIG. 2, a clamp CL is adapted to tether a pipe P and affix the pipe P against the "V" shaped trough formed by the first and second inclined surfaces 2, 4. In order to reliably fasten the pipe thereto, the clamp CL is threaded through one pair of openings 8, where the pair of openings is defined as an opening on each inclined surface 2, 4 on the same side of the saddle. Prior to installation of the support saddle 10 on an underlying support surface, threading the clamp CL through the openings 8 and under the trough is no problem. However, once the support saddle 10 is attached to the surface by means of a fastener passing through the bore 50, substitution of clamps or pipes supported on the saddle would have necessitated removal of the saddle 10 from the support surface or awkward threading of the clamp CL through the two openings 8. With the rectangular cutout 20 provided on both sidewalls, access to the opeings 8 is provided both within the saddle housing and without or outside the housing so that a tether or clamp can be easily removed and a subsequent tether or clamp can expeditiously replace same through the openings 8.

With further respect to FIG. 2, this illustrates a second version or embodiment of the support saddle as compared to the version or embodiment of FIG. 1. The areas of similarity or identity with respect to FIG. 1 are incorporated herein by the same reference numbers. It is to be noted that the rear legs 26, 28 of the embodiment of FIG. 1 have been replaced by a pair of ears 32, 34 extending outwardly from the housing, in a direction away from the line formed by the intersection of the inclined first and second surfaces 2, 4.

In essence, each ear 32, 34 includes respectively a top surface 36, 38 side walls 42, 44 and an end wall 40. The top surfaces 36, 38 respectively include screw holes 46, 48 which allow a fastener such as a screw or a nail to pass therethrough and contact the support surface (not shown).

As suggested by the orientation of the housing support saddle 10 according to the present invention in FIGS. 1 and 2, when a pipe P is to be oriented such that its longitudinal axis extends vertically, (as it would be with respect to the support saddle shown vertically oriented in FIG. 1) it is merely necessary to fasten the saddle 10 to its underlying support by a single fastener through the central hole 50. This result obtains because the area of contact of the pipe against the inclined surfaces 2, 4 actually assists in alignment and support of the saddle with respect to its contact with the pipe P and the support surface. However, when the longitudinal axis of the pipe is horizontal, (as it would be with the horizontally oriented saddle shown in FIG. 2) this "self-centering" effect is not as pronounced, and it is preferable to additionally fasten the saddle 10 to a support surface through the holes 46, 48 provided on the ears 32, 34.

With respect to FIG. 3, the underside of an exemplary support saddle 10 is detailed. As shown, a rib 52 extends along the longitudinal center line of the saddle 10 and provides additional rigidification and support for the saddle, which is believed to be particularly desirable when injection molding is used as the technique for forming the device. This allows more rapid cycling time in the manufacturing process without sacrificing structural strength. In addition, transverse ribs 54 extend from each of the bores 46, 48 in the FIG. 2 version for similar strength considerations. When the version of FIG. 1 is to be manufactured, that is without ears 32, 34, the walls 26, 28 provide sufficient structural rigidity to preclude the use and need for transverse webbing or support. A possible single device 10 can be configured as shown in FIG. 2 with score lines 30 allowing the ears 32, 34 to be broken off to form the FIG. 1 version.

Note that the openings 8 extend not only on the inclined surfaces 2, 4 but also on the canted rear walls 22, 24. By having the openings 8 extend beyond the peak 9, an extremely large variety of pipe or conduit sizes can be constrained within the trough. At one extreme as suggested in FIG. 2, the pipes P are fixed at a lower most portion of the trough through the clamp CL which contacts the opening 8 at a surface of the opening nearest the bottom of the trough. However, as the diameter of the pipe P increases, it is possible to retain extremely large pipe within the saddle 10 so long as only a portion of an arc of the pipe rests within the trough. Because the openings 8 extend on the rear walls 22, 24, a clamp CL can pass therethrough and gird the pipe P. Thus, a maximum pipe diameter which can be accommodated would appear to be a pipe whose areas of tangency with the inclined first and second surfaces occur nearly at the peak 9. Because the imbrications 6 extend all the way up to the peak 9, rotation of the pipe in the support saddle is precluded.

Figures 5, 6, 7, 7A:
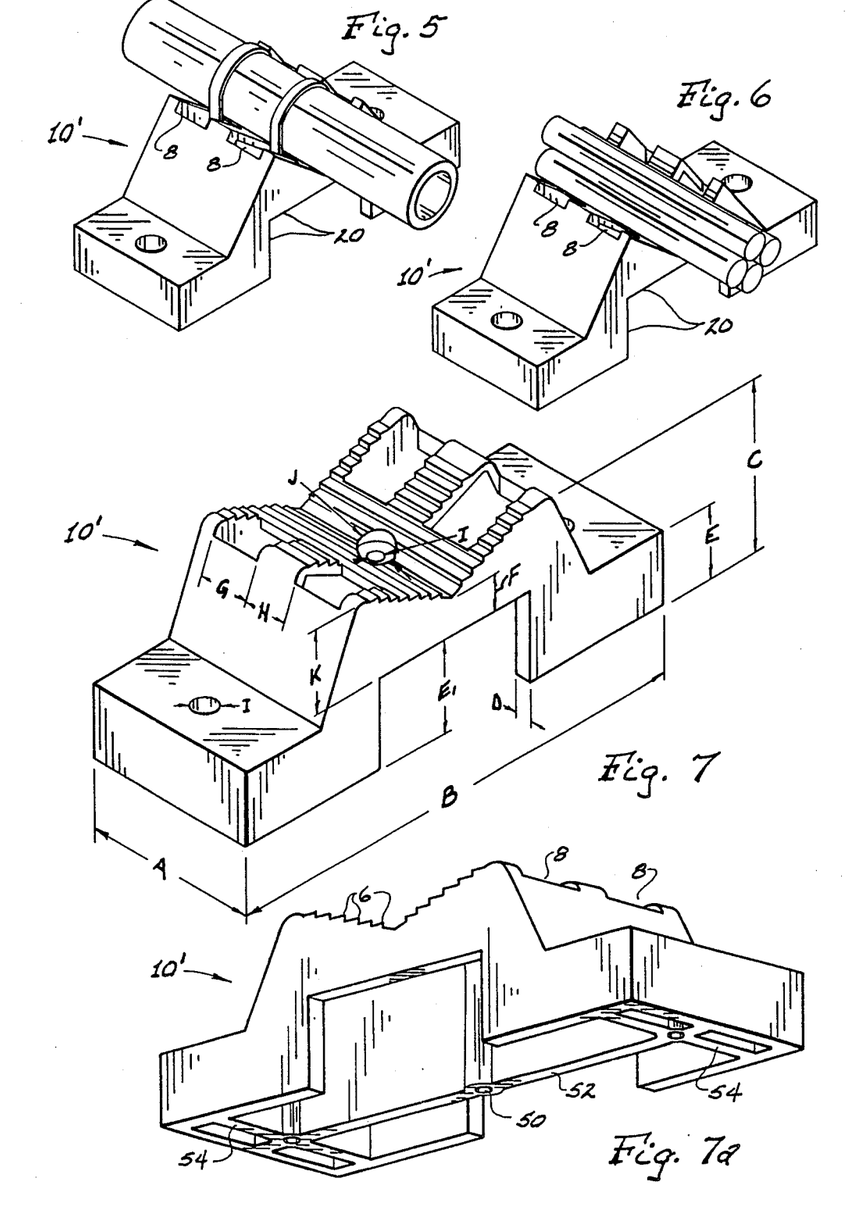
FIG. 5 is a schematic view of the device shown in FIG. 2 wherein a single longitudinal article is tethered to the saddle device.
FIG. 6 is also a schematic view of the device shown in FIG. 2 but wherein the plurality of longitudinal articles is not yet tethered or have been "untethered".
FIGS. 7 and 7a are additional schematic views of the device shown in FIG. 2, but included to illustrate various dimensions or optional dimensional ranges of the lettered components of the device.

FIGS. 5 and 6 are included merely to illustrate the features or operations previously referred to in discussing these figures and/or as to operational steps described.

Figures 8, 9, 10:
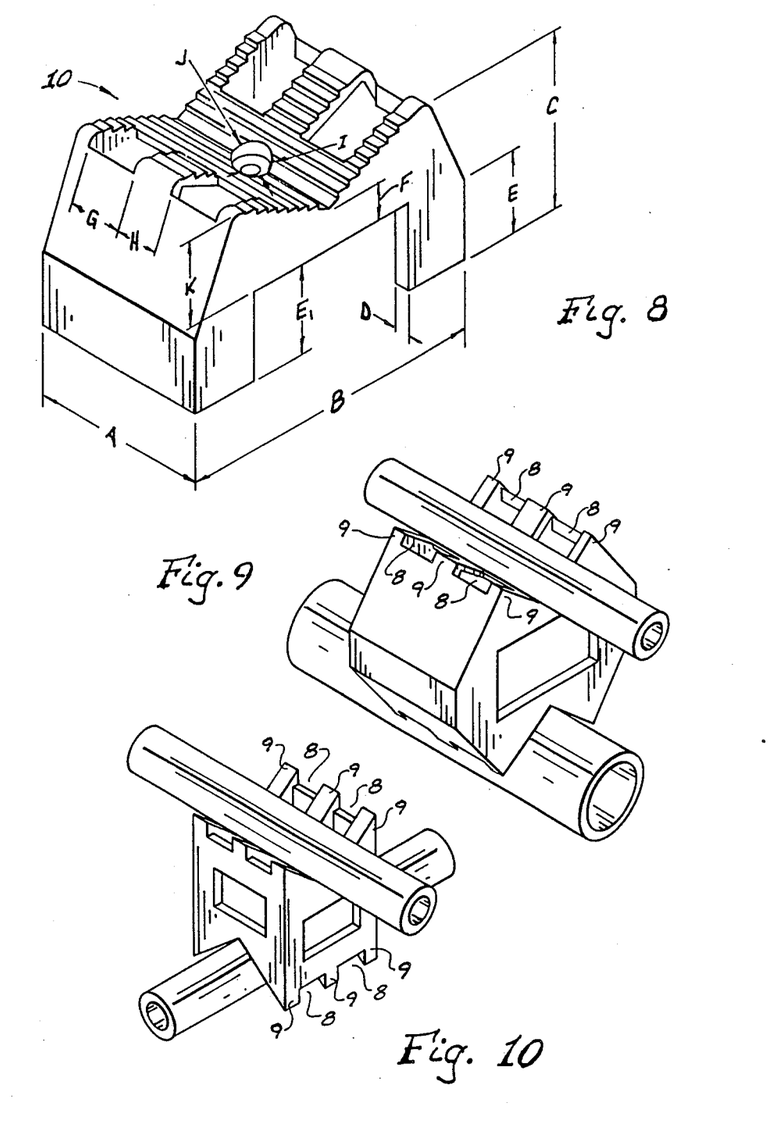
FIG. 8 is like that of FIGS. 7 and 7a except that the lettered dimensions of FIG. 8 relate to the device of the invention illustrated in FIG. 1.
FIG. 9 is a perspective view showing how two support saddles as illustrated in FIG. 1 may be removably attached together so as to become the interposing member between separated elongate articles so as to make possible the parallel tethering or bonding together of longitudinal articles; and/or how the saddle may be attached to cylindrical objects such as flag poles or lamp posts, etc.; i.e., load to load, same direction.
FIG. 10 is a perspective view showing how two support saddles as illustrated in FIG. 1 may be removably attached together so as to become the interposing member between separated elongate articles so as to make possible the perpendicular or transverse tethering or bonding together of longitudinal articles; and/or how the saddle may be attached to cylindrical objects such as flag poles or lamp posts, etc.; i.e., load to load opposite direction.

The schematic views of the support saddles illustated in FIGS. 7, 7a and 8 are set forth to particularly illustrate typical sizes of the lettered dimensions of the saddles, as said saddles are to be manufactured for a particular usage previously referred to, i.e. whether it be for supporting conduits or cables of narrow diameter, for example for electrical applications; or whether, for example, it be for pipeline and/or plumbing pipe applications; it being borne in mind that the broader aspects of the support saddle of this invention are not so limited by various dimensional limitations so long as the support saddles have the specific geometric features and functional features as are included in the claims hereinafter set forth.

Figures 11, 12, 13, 14, 14A:
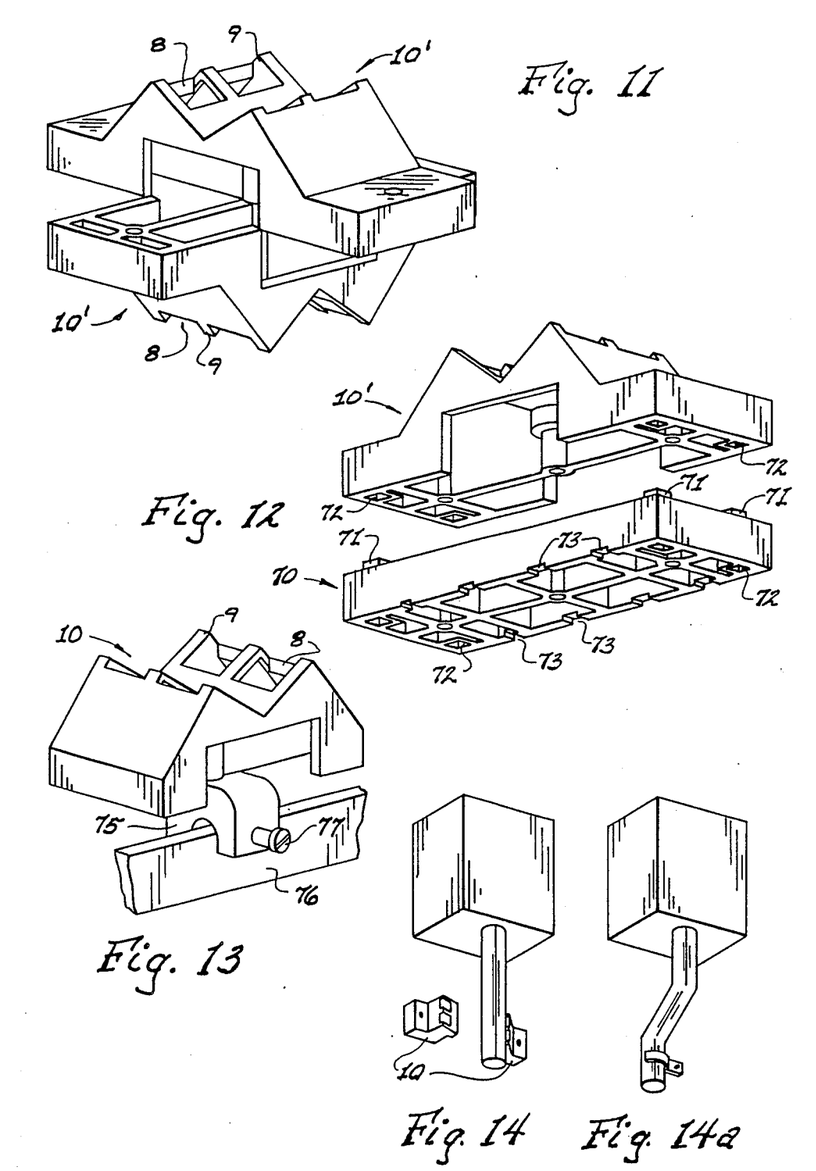

With further reference to what has already been stated concerning FIGS. 9, 10 and 11, it should be added that countersunk hole 50, as illustrated in FIG. 1, comes into play in the procedure of making the two support saddles illustated in these figure the "interposing member" as previously referred to. This is accomplished by threading a bolt through hole 50 in each of the support saddles and fastening a nut to the end of the bolt after it has gone through the second support saddle. The holes at the base of the trough of each of the support saddles typically have an inner diameter I and an outer diameter J as illustrated in FIG. 8 and as these dimensions are further discussed hereinafter. The outer diameter J of the countersunk holes 50 makes it possible to "bury" the head of the bolt and also the nut in said holes without any contacting or interference with the elongate articles to be fastened in the troughs illustrated.

FIG. 12 illustrates an ancillary member 70 which is a complementing removable base which can nest into the bottom of the support saddle 10 by means of pins 71 snugly or compressibly fitting into matching holes 72 (see FIG. 3) so as to controllably alter the distance of the elongate article supported in the trough of the saddle from the support surface. The base of the ancillary member 70 may also have matching holes 72 for pins 71 so that more than one such ancillary member can be used to controllably alter the aforesaid distance. "Nesting" of such bases is also desirable for production and storage purposes. The bottom of said ancillary member is also preferably provided with a plurality of holes 73 so as to allow for fluid drainage, such as where, for example the base is attached to a flat rooftop and it is desirable to allow for water run-off or evaporation. The underside of the removable base or ancillary member 70 preferably also possesses a plurality of honeycomb like grids irrelevant to structural need so as to allow the maximum surface contact with a sealant adhesive, especially where its combination with the support saddle is to be utilized under specified circumstances that no penetration of a fastener into the mounting surface is permited or desireable.

In FIG. 13, the illustrated connection is effected by threading a bolt through hole 50 in the support saddle 10, through a hole of similar diameter in the top of the clamp 75, tightening a nut to the end of the bolt on the underside of clamp to beam 76 via tightening bolt 77.

What is depicted in FIGS. 14 and 14a is believed to have already been fully described previously.

The following Tables are set forth to specifically provide teaching and guidance with reference to the foregoing discussion re: typical dimensions.

TABLE 1

| Light Duty Applications | |
|---|---|
| Dimensions of Support Saddle of FIG. 7 Specific | Dimensions of Support Saddle of FIG. 8 Specific |
| A 1⅛" | A 1⅛" |
| B 3" | B 2" |
| C 1⅛" | C 1⅛" |
| D ¾" | D ¾" |
| E ⅝" | E ⅝" |
| E₁ ½" | E₁ ½" |
| F ¼" | F ¼" |
| G ⅝" | G ⅝" |
| H 3/16" | H 3/16" |
| I 3/16" | I 3/16" |
| J ½" | J ½" |
| K ½" | K ½" |

In addition to the foregoing, dimensions of the base of the Support Saddle of FIGS. 2 and 7 (see FIG. 3) are substantially as follows: openings 61 and 62 for cement— 3/16" wide by ⅜ long by ½ deep.

Openings for cement in a support saddle as shown in FIGS. 1 and 8 would have substantially the same dimensions.

TABLE 2

| Heavy Duty Applications | |
|---|---|
| Dimensions of Support Saddle of FIG. 7 Specific | Dimensions of Support Saddle of FIG. 8 Specific |
| A 1⅜" | A 1⅜" |
| B 5⅜" | B 3½" |
| C 1⅜" | C 1⅜" |
| D ¾" | D ¾" |
| E 11/16" | E 11/16" |
| E₁ 1" | E₁ 1" |
| F ⅜" | F ⅜" |
| G ⅝" | G ⅝" |
| H ½" | H ½" |
| I ½" | I ½" |
| J ½" | J ½" |
| K ⅞" | K ⅞" |

In addition to the foregoing, dimensions of the openings for cement in either of the support saddles as illustrated by FIGS. 2 and 7 or by FIGS. 1 and 8 would typically be 5/16" wide by ¾ long by ½ deep.

The foregoing measurements set forth in Tables 1 and 2 are representative but it should be appreciated that the saddles having the dimensions indicated may be used for either application set forth in the titles of the Tables; and that the sizes indicated are not to be interpreted as limiting but are included because of optimum stand off design functions and other engineering considerations pertinent to manufacturing sizes that are addressing specific applicatory tasks in the marketplace at the present time.

SUMMARY OF PRODUCT USAGE, BENEFITS AND ADVANTAGES

The support saddle of the present invention having the geometric and functional features previously described is a securing device that can be fastened to most any surface by the use of nails, screws or adhesive. It can be used to secure and/or support most all sizes of piping, wiring and other conduit type products presently on the market. It complements and requires the use of tie wraps, (e.g. vinyl), hose clamps, (e.g. stainless steel) plumbers tape and other basic products that are employed by the tradesmen in their respective fields of work. The support saddle is unique in that one saddle of its shape and size fits a wide range of elongated articles some of which are not logically pertinent to its actual size. In other words, the saddle will constrain an article within its supporting trough, and engage a required amount of surface contact between its imbricated supported walls and the surface of the article which it is supporting, so as to accept a wide range of articles almost regardless of their outside diameter. This support saddle accommodates various different complementary tethering items previously indicated, i.e. whether the tether be a tie wrap or a hose clamp or a plumber'tape, etc. As to this usage advantage, it should be particularly noted that tradesmen are constantly "fighting the battle" of always having to have the particular strap for that particular application.

As previously stated, the support saddle is secured in place with the use of nails, screws or adhesive/sealant on an existing surface. The load is then placed in the V shaped channel or trough. The user employs cable ties, plumber's tape, hose clamps, and other products presently on the market and slips them through the open slots and under the base through the opposing open slot, around the load and connects them together with their own respective means of fastening.

The support saddle is universal in that its particular shape fits a wide range of load(s) that are presently done by a singular strap, or securing method, made only for that load; such as a pipe with a particular outside diameter needs a strap or securing method for only that outside diameter.

A particularly long-felt need that the idea fulfills is that it provides for a quality and professional installation on rooftops and sidewall applications where it replaces the typical and/or general use of blocks of wood and expensive means by way of time-consuming labor and material to support and "stand off" the load from the roof or sidewall. In such cases, the use of support saddles of the present invention saves material and labor, provides longer service life than wood blocks on rooftops, provides "anti-twisting of load" capability. The support saddle is also easy to install, chemically resistant, vibration resistant, ultra-violet resistant, will not rust and will not corrode. If need be, the load is also capable of being removed and replaced quickly and cost effectively.

Its use also overcomes the age-old problem of having the right strap for the particular securing task; and replacing blocks of wood (e.g. redwood blocks and two-hole straps) on rooftops that are placed to support load; also relieves user of obtaining and cutting wood blocks.

The support saddles of the present invention are of particular use to plumbers, electricians, utility companies, air conditioning and heating contractors, mechanical contractors; industries such as airline, automotive and shipyard; and to anyone that needs to secure longitudinal type loads such as previously referred to.

The following is a summary of examples of some of the various tasks for which the support saddles of the present invention can be used:

(1) Securing electrical conduit on roof tops, sidewalls, and other surfaces.

(2) Securing gas lines, water lines, insulated steam lines, drain lines etc., utilizing plumbers tape and hose clamps that the plumber already employs.

(3) Securing insulated refrigeration lines as well as non-insulated lines.

(4) Securing solar piping on rooftops, replacing redwood blocks of wood and other means of securing; not only achieving an aesthetically nice appearing job, but also functionally providing a leak-proof and maintenance-free installation.

(5) Securing wire of all kinds, such as telephone wiring, electrical romex wiring, large conductors inside panel boards, computer wiring, television wiring, stage wiring, stereo wiring, communications wiring, etc.

(6) Securing drip irrigation lines of all sizes up to 4'.

(7) Securing many other forms of objects to existing surfaces, such as fire extinguishers, flag poles, antennaes, downspouts, etc.

(8) Securing a combination of all the aforesaid.

Basically the support saddle of the present invention is a "use your imagination type of product", and will work on virtually all kinds of securing tasks, even in a "reverse application" such as affixing a sign to a light pole, or connecting any other flat surfaced object to any other round surface object. Moreover, having thus described the invention, it should be apparent that numerous structural modifications and adaptations may be resorted to without departing from the scope and fair meaning of the instant application as described here and above and as claimed here and below.

What is claimed is:

1. A support saddle comprising, in combination: first and second support walls inclined such that said walls define a substantially "V" shaped trough so that articles can be placed within said trough,
   means for attaching said trough to a support surface,
   and means for removeably attaching a tether around said trough and over the articles to constrain the articles thereto,
   wherein said removable tether attaching means includes a plurality of openings at portions of said trough remote from the lower crotch portion of said "V" shaped trough,
   wherein said trough is formed from a pair of inclined surfaces forming a "V", a pair of rear walls extending from edges of said inclined surfaces remote from said crotch portion, and side walls extending between said rear walls and side edges of said inclined surfaces,
   wherein a peak is defined by the juncture of said inclined surface and said rear walls, and said openings extend down on said rear wall allowing unobstructed tethering of much larger diameter articles,
   and wherein said side walls include a cutaway portion on said walls defining an access area to a portion of the underside of said saddle, allowing manual directing and other manipulation of the tethering means, regardless of saddle being secured or unsecured to the mounting surface.

2. A support saddle according to claim 1 including one of more holes integral within said saddle whereby fasteners may pass therethrough allowing it to be installed to an underlying surface.

3. A support saddle according to claim 1 including one or more holes integral within said saddle whereby fasteners may pass therethrough allowing it to be attached to another such saddle thereby achieving the ability of connecting one elongate article to or along another elongate article.

4. A support saddle according to claim 2 including a sealed portion surrounding one or more of said hole(s) that is integral within the saddle, creating a chamber for adhesive or sealant to be interpolated, whereby upon installation of the fastener device, the chamber becomes pressurised, thereby directing the sealant to the point of penetration of the fastener on and into the mounting surface.

5. A support saddle according to claim 2 wherein the saddle includes an integral base so as to elevate the tethered articles from the mounting surface.

6. A support saddle according to claim 3 wherein the saddle includes an integral base so as to elevate the tethered articles from the mounting surface.

7. A support saddle according to claim 1 said trough includes imbrications on its article engaging surface, forming a stair-like retention surface for gripping the article.

8. A support saddle according to claim 7 wherein the imbrications in the trough in combination with the pressure applied by the tethering means provides for controllably gripping the article in such a manner so as to prevent twisting or other movement of the article through substantial tightening of the tethering means.

9. A support saddle according to claim 7 wherein the imbrications in the trough in combination with the pressure applied by the tethering means provides for controllably gripping the article in such a manner so as to provide for minute contact of the saddle surface to the article surface, so as to retain migration control over the article via the applied tension on the tethering means.

10. A support saddle according to claim 1 wherein said means for attaching the saddle to the support surface is unobstrictive of articles in said trough.

11. A support saddle according to claim 10 wherein said attaching means is unobstructive of articles in said troughs regardless of whether the articles placed within said troughs are pre-secured thereto or not.

12. A support saddle according to claim 1 wherein said tether attaching means can be removed and replaced with subsequent tether attaching means without detaching the support saddle from the support surface after it has been attached thereto.

13. In combination, a support saddle according to claim 1 and a complementing removable base that can be removed or another said removable base attached thereto, so as to controllably alter the distance of the article supported in trough from the support surface.

14. A combination according to claim 13 wherein the complementing removable base possesses pins that align with holes in the support saddle, and connect to said saddle so that no other fastening means are needed between the base and the support saddle.

15. A combination according to claim 13 wherein the removable base that contacts the support surface possesses a plurality of holes integral with said base so as to allow for fluid drainage.

16. A combination according to claim 13 wherein the removable base that contacts the support surface possesses a plurality of honeycomb grids irrelevant to structural need so as to allow the maximum surface contact with a sealant adhesive, where the combination is to be utilized under specified circumstances that no penetration of a fastener into the mounting surface is permitted or desirable.

17. In combination, two support saddles according to claim 1 wherein said two saddles can be removably attached together so as to become the interposing member between separated elongate articles, thereby allowing the bonding together of said elongate articles in a parallel direction to one another.

18. In combination, two support saddles according to claim 1 wherein said two saddles can be removably attached together so as to become the interposing member between separated elongated articles, thereby allowing the bonding together of said elongate articles in a perpendicular direction to one another.

19. In combination, two support saddles according to claim 1 having flat mating surfaces and wherein said two saddles can be removably attached together so as to become the interposing member between separated elongated articles, thereby allowing the bonding together of said elongate articles in any direction up to 360 degrees to one another.

20. A method for attaching an elongate article to a support surface which comprises cutting a support saddle as described in claim 1 substantially in half at the base of the "V" shaped trough, sliding each half of the support saddle behind the elongate article, one half on each side thereof and against the support surface and attaching a tether beneath the sub-joined trough and over the elongate article to constrain the article to the sub-joined trough.

21. A method according to claim 20 wherein each half of the support saddle is first attached to the support surface before using the tether to constrain the article to the sub-joined trough.

22. A method according to claim 20 wherein the tether is attached beneath the sub-joined trough and over the elongate article before the halves of the support saddle are attached to the support surface.

23. A support saddle device for supporting singular, or in plurality, elongate articles to an underlying surface, comprising, in combination:
   a trough upon which the articles are to be placed;
   a housing integrally formed with said trough including
      attachment means to secure said device on a separate mounting surface; and access opening means on said device to allow a removeable tether to pass therethrough and to be manually directed under said trough, and through other opening means integral with said device, so as to allow the tethering means to encircle the articles and connect to themselves, thereby constricting said articles to a portion of the surface engaging area of the trough,
   wherein said trough includes imbrications on its article engaging surface, forming a stair-like retention surface for gripping the article,
   wherein said removable tether attaching means includes a plurality of openings at portions of said trough remote from the lower crotch portion of said "V" shaped trough,
   wherein said trough is formed from a pair of inclined surfaces forming a "V", a pair of rear walls extending from edges of said inclined surfaces remote from said crotch portion, and side walls extending between said rear walls and side edges of said inclined surfaces,
   wherein a peak is defined by the juncture of said inclined surface and said rear walls, and said openings extend down on said rear wall allowing unobstructed tethering of much larger diameter articles,
   and wherein said side walls include a cutaway portion on said walls defining an access area to a portion of the underside of said saddle, allowing manual directing and other manipulation of the tethering means, regardless of saddle being secured or unsecured to the mounting surface.

24. A support saddle according to claim 23 including one or more holes integral within said saddle whereby fasteners may pass therethrough allowing it to be installed to an underlying surface.

25. A support saddle according to claim 23 including one or more holes integral within said saddle whereby fasteners may pass therethrough allowing it to be attached to another such saddle thereby achieving the ability of connecting one elongate article to or along another elongate article.

26. A support saddle according to claim 24 including a sealed portion surrounding one or more of said hole(s) that is integral within the saddle, creating a chamber for adhesive or sealant to be interpolated, whereby upon installation of the fastener device, the chamber becomes pressurised, thereby directing the sealant to the point of penetration of the fastener on and into the mounting surface.

27. A support saddle according to claim 24 wherein the saddle includes an integral base so as to elevate the tethered articles from the mounting surface.

28. A support saddle according to claim 25 wherein the saddle includes an integral base so as to elevate the tethered articles from the mounting surface.

29. A support saddle according to claim 23 wherein the imbrications in the trough in combination with the pressure applied by the tethering means provides for controllably gripping the article in such a manner so as to prevent twisting or other movement of the article through substantial tightening of the tethering means.

30. A support saddle according to claim 23 wherein the imbrications in the trough in combination with the pressure applied by the tethering means provides for controllably gripping the article in such a manner so as to provide for minute contact of the saddle surface to the article surface, so as to retain migration control over the article via the applied tension on the tethering means.

31. A support saddle according to claim 23 wherein said means for attaching the saddle to the support surface is unobstrictive of articles in said trough.

32. A support saddle according to claim 31 wherein said attaching means is unobstructive of articles in said troughs regardless of whether the articles placed within said trough are pre-secured thereto or not.

33. A support saddle according to claim 13 wherein said tether attaching means can be removed and replaced with subsequent tether attaching means without detaching the support saddle from the support surface after it has been attached thereto.

34. In combination a supporting device according to claim 23 and a complementing removable base that can be removed or another said removable base attached thereto, so as to controllably alter the distance of the elongate article supported in trough from the support surface.

35. A combination according to claim 34 wherein the complementing removable base possesses pins that align with holes in the support saddle, and connect to said saddle so that no other fastening means are needed between the base and the support saddle.

36. A combination according to claim 34 wherein the removable base that contacts the support surface possesses a plurality of holes integral with said base so as to allow for fluid drainage.

37. A combination according to claim 34 wherein the removable base that contacts the support surface possesses a plurality of honeycomb grids irrelevant to structural need so as to allow the maximum surface contact with a sealant adhesive, where the combination is to be utilized under specified circumstances that no penetration of a fastener into the mounting surface is permitted or desirable.

38. In combination, two supporting devices according to claim 23 wherein said two devices can be removably attached together so as to become the interposing member between separated elongate articles, thereby allowing the bonding together of said elongate articles in a parallel direction to one another.

39. In combination, two supporting devices according to claim 23 wherein said two devices can be removably attached together so as to become the interposing member between separated elongated articles, thereby allowing the bonding of said elongate articles in a perpendicular direction to one another.

40. In combination, two supporting devices according to claim 23 wherein said two devices can be removably attached together so as to become the interposing member between separated elongated articles, thereby allowing the bonding together of said elongate articles in any direction up to 360 degrees to one another.

41. A method for attaching an elongate article to a support surface which comprises cutting a support device as described in claim 23 substantially in half at the base of the trough, sliding each half of the support device behind the elongate article, one half on each side thereof and against the support mounting surface and attaching a tether beneath the sub-joined trough and over the elongate article to constrain the article to the sub-joined trough.

42. A method according to claim 41 wherein each half of the support device is first attached to the support mounting surface before using the tether to constrain the article to the sub-joined trough.

43. A method according to claim 41 wherein the tether is attached beneath the sub-joined trough and over the elongate article before the halves of the support device are attached to the support mounting surface.

* * * * *